(12) United States Patent
Forsten et al.

(10) Patent No.: US 6,312,561 B1
(45) Date of Patent: Nov. 6, 2001

(54) FLAME BARRIER COMPOSITIONS AND THEIR USE

(75) Inventors: Herman Hans Forsten, Williamsburg, VA (US); Sami Khan, Greenville, DE (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/489,067

(22) Filed: Jan. 21, 2000

(51) Int. Cl.⁷ ..................................... D21F 11/00
(52) U.S. Cl. ................. 162/145; 162/152; 162/157.2
(58) Field of Search ................... 524/449; 162/145, 162/152, 157.2

(56) References Cited

U.S. PATENT DOCUMENTS

| | | | |
|---|---|---|---|
| 3,080,272 | 3/1963 | Jackson | 162/157 |
| 4,060,451 | 11/1977 | Uchiyama et al. | |
| 4,286,013 | 8/1981 | Daroga et al. | 428/266 |
| 5,266,395 | * 11/1993 | Yamashita | 428/292 |
| 5,393,872 | 2/1995 | Shinoki et al. | 528/310 |
| 5,830,319 | 11/1998 | Landin | 162/159 |
| 6,166,114 | * 12/2000 | Cosstick | 524/100 |

FOREIGN PATENT DOCUMENTS

| | | |
|---|---|---|
| 0 373 137 A2 A3 | 6/1990 | (EP) . |
| 1129097 A | 10/1968 | (GB) . |
| 57 170413 A | 10/1982 | (JP) . |
| WO 00/32388 A2 | 6/2000 | (WO) . |

OTHER PUBLICATIONS

PCT International Search Report.

* cited by examiner

Primary Examiner—Paul R. Michl

(57) ABSTRACT

A sheet composition with certain proportions of meta-aramids and mica used as a flame barrier composition.

7 Claims, 2 Drawing Sheets

FLAME BARRIER COMPOSITIONS AND THEIR USE

BACKGROUND OF THE INVENTION

1. Field of the Invention

This invention relates to aramid and mica paper compositions and to a process for using such compositions as flame barriers.

2. Description of Related Art

U.S. Pat. No. 3,080,272, issued Mar. 5, 1963 on the application of D. E. Jackson discloses a composition including fibrids, such as meta-aramid fibrids, and flake-like materials, such as mica for use decorative panels, electrical insulation, or molded shapes.

U.S. Pat. No. 5,393,872, issued Feb. 28, 1995 on the application of Shinoki et al. discloses the preparation of sheets made from meta-aramid fibrids and mica for electrical insulation.

BRIEF SUMMARY OF THE INVENTION

This invention relates to a flame barrier paper composition made from meta-aramid fibrids and mica. The composition is defined by its ability to slow the advance of a flame by exhibiting a burnthrough time of at least 240 seconds under conditions of an FAA Burnthrough Test Standard for Aircraft Insulation at a temperature of at least 1150° C. (2100° F.), as will be described herein.

The invention also relates to a process for slowing the advance of a flame comprising the steps of placing the composition in a path of the flame and holding it there to absorb and reflect heat from the flame.

BRIEF DESCRIPTION OF THE DRAWING(S)

FIG. 1A depicts a steel frame designed to simulate the stringers in the sidewall construction of an aircraft. FIG. 1B depicts the relative locations of heat source, test panel, and calorimeter for conduct of the test.

DETAILED DESCRIPTION OF THE INVENTION

Figure 1B:
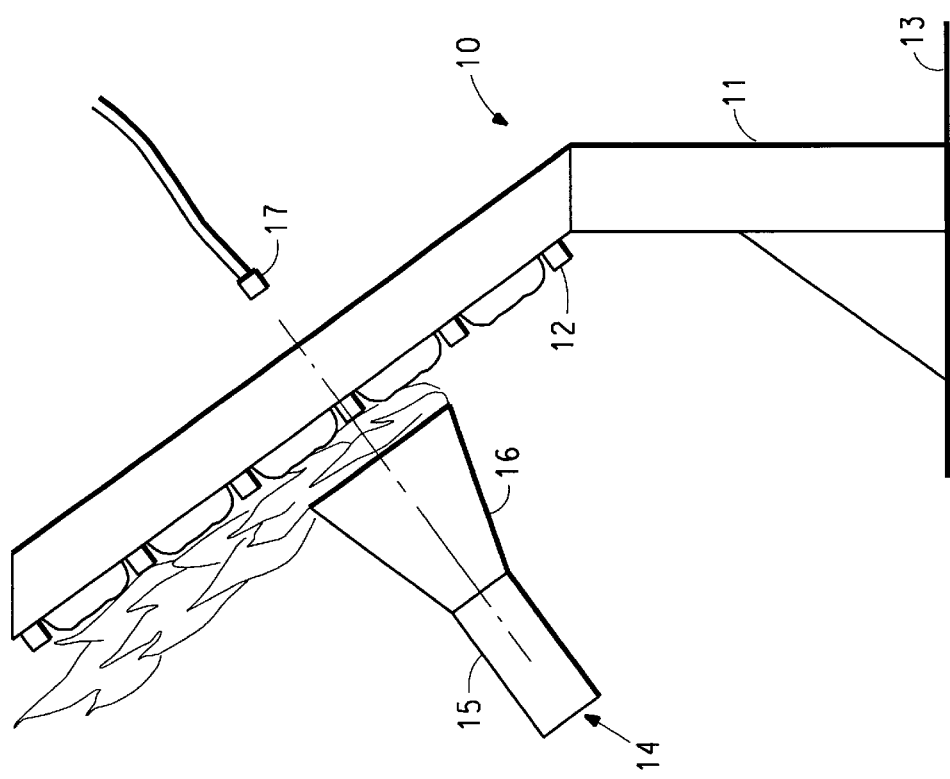
FIGS. 1A and 1B are schematic drawings of an apparatus used for performing the aforementioned Burnthrough Test.

Flame barrier compositions are important and highly sought after. Architectural and vehicular construction demands flame barrier compositions for the safety and comfort of inhabitants and passengers. Aircraft construction, in particular, has great need for lightweight, flexible, flame barrier compositions. The present invention provides such compositions used for the first time as flame barrier material.

The flame barrier composition of this invention is a combination of meta-aramid fibrids, floc, and mica formed into a flexible, continuous, sheet composed of thin uniform, layers. Meta-aramid fibrids are filmy particles of meta-aramid material having relatively large length and width dimensions (typically 100 to 500 microns) and an extremely small thickness dimension (typically 0.1 micron). Fibrids are made by introducing a solution of polymer into a vigorously agitated liquid that is mixable with the solvent of the polymer solution and is not a solvent for the polymer itself. Fibrids and their manufacture are disclosed in U.S. Pat. No. 2,999,788. The preferred meta-aramid for fibrids used in this invention is poly(m-phenylene isophthalamide).

Meta-aramid floc is short fibers cut from continuous filaments. The floc is 10 to 15 microns in diameter and 3 to 15 millimeters in length. The preferred meta-aramid for floc is poly(m-phenylene isophthalamide).

Mica is a well-known crystallized mineral silicate in a variety of monoclinic forms that readily separate into very thin leaves or plates. Examples of mica are Grannitic potassium mica represented by typical chemical formulae $K_2Al_4Al_2Si_6O_{22}(OH)_4$ and $H_2KAl_3(SiO_4)_3$. A second example is Pyroxenic mica (magnesium mica) represented by typical idealized formulae $K_2Mg_4Al_2Si_6O_{20}(OH)_4$ and $H_2KMg_3Al(SiO_4)_3$. Mica used in practice of this invention has a flat particle size of 100 to 500 microns and a thickness of 0.05 to 0.15 microns.

Present-day flame barrier requirements are extremely harsh, as will be set out below in "Test Methods"; and, in fact, the measure of success of a flame barrier composition can be found in whether or not it can pass a standard Flame Barrier Test.

It has been discovered that the flame barrier composition of this invention should have 25 to 60, preferably 35 to 45, weight percent meta-aramid fibrids, 0 to 20, preferably 10 to 15, weight percent meta-aramid floc, and 40 to 70, preferably 45 to 55, weight percent mica. Compositions having less than 25 weight percent meta-aramid fibrids lack the needed flexibility and strength while compositions having more than 60 weight percent meta-aramid fibrids are too weak in a flame to prevent disintegration. Compositions with some meta-aramid floc exhibit improved strength and flexibility but compositions with more than 20 weight percent floc exhibit reduced strength and composition cohesiveness. Compositions having less than 40 weight percent mica lack needed heat resistance to withstand flame penetration. While compositions having more than 75 weight percent mica are too stiff and brittle.

The flame barrier composition of this invention is generally made in sheet form as paper on papermaking machinery and generally has a basis weight of 90 to 204 $g/m^2$ and a thickness of 0.075 to 0.33 millimeters.

While any weight of the composition has some effect as a flame barrier, the composition that is most generally used as flame barrier material is made by compacting the paper using high pressure and/or high temperature calendering. The calendering brings mica platelets into close contact together. The flame barrier composition of this invention used in the FAA Flame Burnthrough Test, has 1 to 3 layers of paper at a total basis weight of 100 to 500 $g/m^2$ and a total thickness of 0.10 to 1.00 millimeter.

Because the flame barrier composition may be positioned or used in extreme environments, it has been found advantageous to apply a moisture blocking material layer to the surface of the barrier composition. The preferred moisture blocking material is a fluoropolymer such as the product sold by E. I. du Pont de Nemours and Company under the tradename of Zonyl 7040. The moisture blocking material layer can be in the form of a coating at a coating weight of 0.5 to 1.0 weight percent, based on the total weight of the coated composition.

Figure 2:
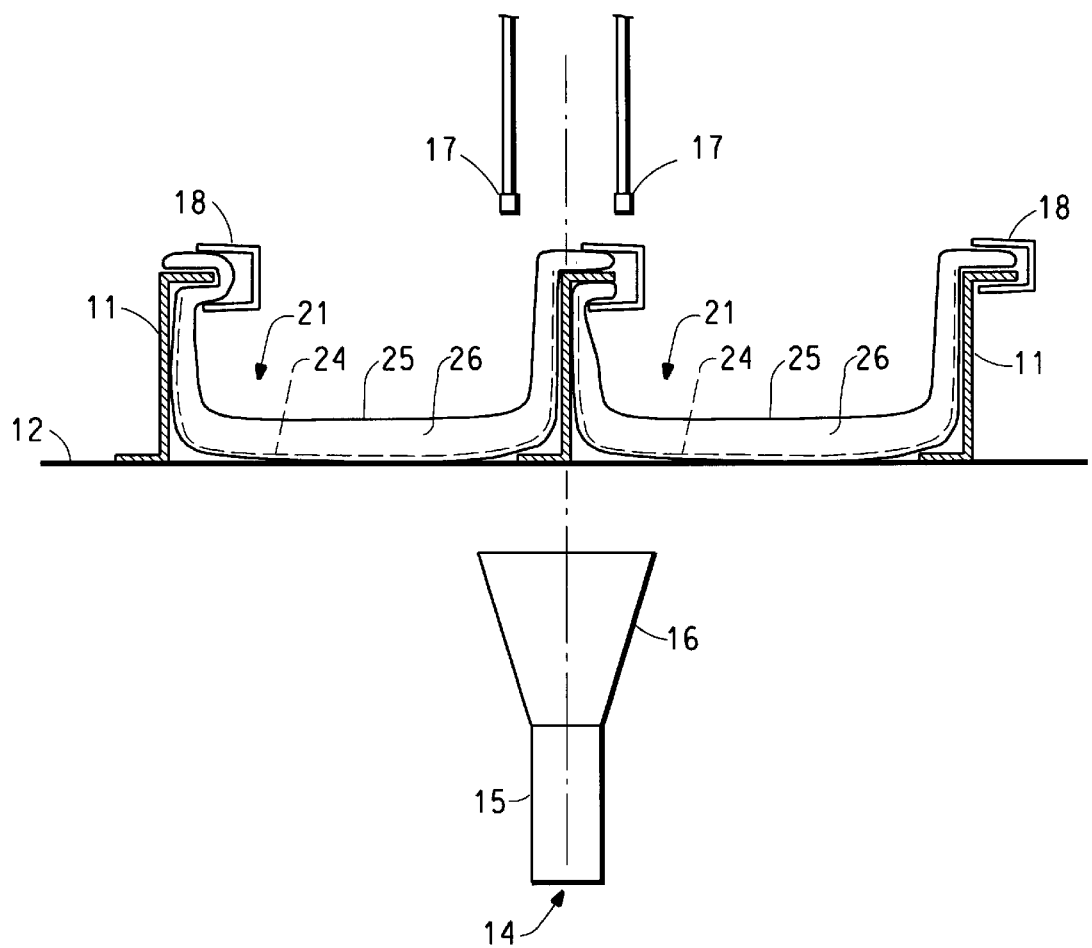
FIG. 2 is a cross-sectional view of a test configuration.

If additional protection is desired, the entire composition can be placed in a bag of protective polymeric film. FIG. 2 shows an assembly of a composition of this invention in a testing frame for the FAA Burnthrough Test Standard. Units of barrier composition 21 are held in a cavity bordered by formers 11 and stringers 12. Barrier composition 21 comprises paper 24 and bagging film 25. Paper 24 can be unattached to bagging film 25 or it can be adhered thereto. By adhering paper 24 to bagging film 25, increased tear resistance is obtained. Space 26 in bagging film 25 can be, and generally is, filled with sound and thermal insulative material such as glass wool, aramid batting, and the like. Bagging film 25 can be made of any film forming polymeric material. Polyester, polyvinyl fluoride, polyimide, and the like, are preferred.

The flame barrier composition of this invention is used to slow the advance of a flame front by positioning the composition directly in the path of the flame and holding it there to absorb and reflect heat from the flame thus preventing burnthrough to objects on the opposite side of the composition.

Test Methods

FAA Burnthrough Test Standard. This test evaluates burnthrough resistance of aircraft insulation compositions on exposure to high intensity open flame. The test yields a burnthrough time which is the time required (seconds) for a burner flame to penetrate the test specimen or the time for heat flux on the opposite side of the test specimen to reach 8.6 Kcal/m$^2$sec (2.0 BTU/ft$^2$sec) at a distance of 30 cm (12 inches) from the burner side of the test frame.

Figure 1A:
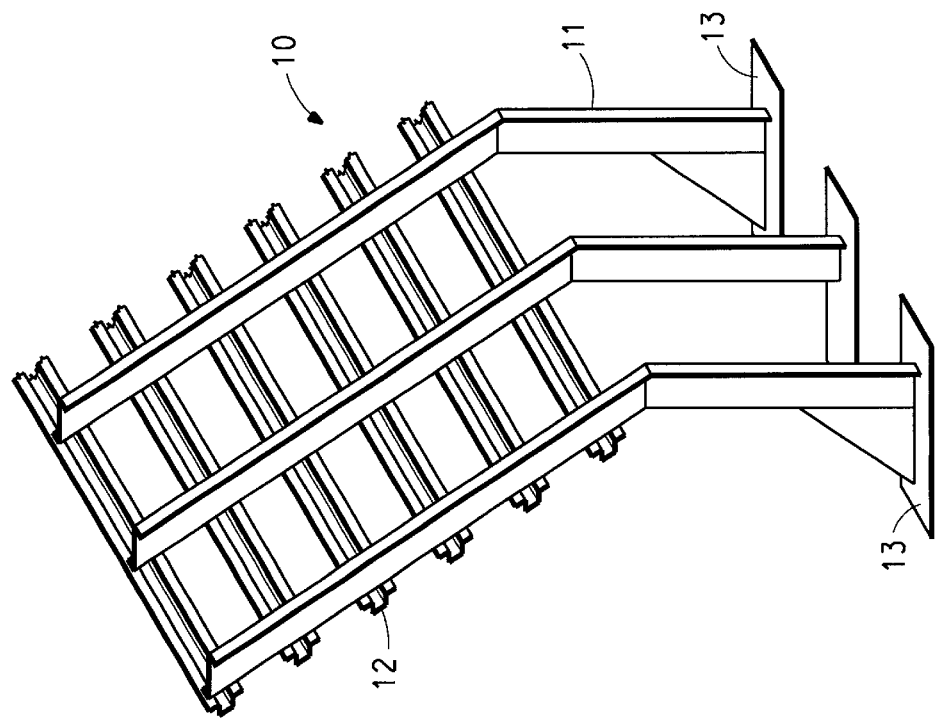

Referring to FIG. 1A, test frame 10 is constructed from steel formers 11 and steel stringers 12 on base plates 13. Test frame 10 simulates the fuselage structure of an aircraft. Formers 11 are generally spaced 20 cm (8 inches) apart and stringers 12 are generally spaced 50 cm (20 inches) apart.

Burner configuration for the Test is shown in FIG. 1B. Burner 14 is a gun-type, such as Park Model DPL 3400 sold by Park Oil Burner Mfg. Co., Atlantic City N.J., with draft tube 15 and burner cone 16. Burner cone 16 has an oval opening 15.3±0.6 cm (6 ±0.125 inches) high and 28 ±0.6 cm (11±0.125 inches) wide and the burner is fueled by ASTM K2 or ASTM D2 fuel delivered at a rate of 0.38 liter/minute (6.0 gallon/hour) under a pressure of 0.71 MPascal (100 lb/in$^2$).

Burner 14 is positioned such that the end of burner cone 16 is 10 cm (4 inches) from test frame 10 and aimed directly at an intersection of a former 11 and a stringer 12. Flow of air to burner 14 is adjusted such that heat flux at test frame 10 is 58 Kcal/m$^2$sec (13.5 Btu/ft$^2$ sec) and the temperature at the frame is 1150±56° C. (2000±100° F.)

As stated, one determination of burnthrough is the time for heat flux on the opposite side of the test specimen to reach 8.6 Kcal/m$^2$ sec. (2.0 Btu/ft$^2$ sec) 30 cm (12 inches) from the burner side of the test frame. Calorimeters 17 are positioned for that determination.

To conduct the Test, a sample barrier composition 21 is positioned between formers 11 in test frame 10 and held in place by clips 18.

Burner 14 is lighted and positioned for the Test and time of exposure of sample barrier composition 21 to flames from burner 14 is determined. The Test is conducted for at least 240 seconds or until the burnthrough or heat flux limits are reached, whichever is first.

EXAMPLES

Example 1

A small-scale test using a Meeker burner was used to assess the burnthrough resistance of various materials. A 15 cm×15 cm×0.3 cm (6"×6"×⅛") steel frame, having a 13 cm×13 cm (5.25"×5.25") opening, was positioned on a ring stand and 2.5 cm (1") above a burner with a 2.5 cm (1") high propane flame with a temperature of 1150° C. (2100° F.). A separate 15 cm×15 cm×5 cm (6"×6"×2") steel box, with a wall thickness of 0.3 cm (⅛"), and an open top and bottom was placed on top of the frame to hold test materials. A thermocouple mounted in a 15 cm×15 cm×1.25 cm (6"×6"× ½") ceramic board was placed on top of the box to measure the temperature rise through the test materials. Initial tests (Table I) showed that all films tested and all aramid-only papers tested broke open in less than 10 seconds and provided no significant protection from the flame. Papers made from a combination of mica and aramid fibers, both high pressure calendered and not, did not shrink in the flame and prevented flame penetration. Aramid/mica papers as thin as 0.075 mm (3 mil) were effective flame barriers. Typical insulating materials (fiberglass batting and aramid battings), even when positioned behind polyimide facing films, had little impact on the performance and themselves suffered rapid burnthrough, as shown in Table II.

TABLE I

Small Scale Component Burnthrough Trials

| Sample | Thickness | Time to Burnthrough (sec) |
|---|---|---|
| Undensified Aramid Paper[1] | 0.25 mm | 1.13 |
|  | 0.38 mm | 1.75 |
| Densified Aramid Paper[1] | 0.08 mm | 0.79 |
|  | 0.13 mm | 1.7 |
| Spunlaced Kevlar ® Aramid Style Z-11[2] | 50 g/m$^2$ | 10.2 |
|  | 100 g/m$^2$ | 16.6 |
| Kapton ® Polyimide Film[3] | 0.025 mm | 2.5 |
| Undensified Aramid/Mica Paper[4] | 0.18 mm | No burnthrough after 300 sec |
| Densified Aramid/Mica Paper[4] | 0.08 mm | No burnthrough after 300 sec |
|  | 0.13 mm | No burnthrough after 300 sec |
|  | 0.20 mm | No burnthrough after 300 sec |

[1]Aramid Paper was material made from about 55 weight percent m-aramid fibrids and about 45 weight percent m-aramid floc and sold by E. I. du Pont De Nemours and Company under the trade name Nomex ® aramid paper. Such aramid paper is sold in undensified, or uncalendered form and in densified, or calendered form.
[2]Spunlaced Kevlar ® Aramid was a material made from p-aramid staple fibers which were hydroentangled to yield a sheet form and sold by E. I. du Pont de Nemours and Company under the trade designation Style Z-11. "Style Z-11" designates an all para-aramid fiber product.
[3]Kapton ® brand Polyimide Film was sold by E. I. du Pont de Nemours and Company.
[4]Aramid/Mica paper was a material made of about 37 weight percent meta-aramid fibrids, about 48 weight percent mica, and about 15 weight percent meta-aramid floc and sold by E. I. du Pont de Nemours and Company under the trade name Nomex ® M aramid and mica paper. Such aramid paper is sold in undensified or uncalendered form and in densified, or calendered form.

TABLE II

Results of Small Scale Burnthrough Trials

| Sample Structure | Time to Burnthrough or to Reach 205° C. (400° F.) |
|---|---|
| Aramid Batt[1] (32 mm thick, 42 kg/m$^3$) | 120 sec burnthrough |
| Kapton ® Polyimide Film Face (0.025 mm thick) + Fiberglass Batt[2] (50 mm thick, 6,9 kg/m$^3$) | 171 sec (film split in 5 sec) |
| Densified Aramid Mica Paper Face (0.08 mm) + Aramid Batt (32 mm) | 122 sec reached 205° C./400° F. |
| Densified Aramid Mica Paper Face (0.13 mm) + Aramid Batt (32 mm) | 226 sec reached 205° C./400° F. |
| Densified Aramid Mica Paper Face (0.08 mm) + Fiberglass Batt (50 mm) | 348 sec reached 205° C./400° F. |
| Undensified Aramid Mica Paper Face (0.20 mm) + Fiberglass Batt (50 mm) | 469 sec reached 205° C./400° F. |

TABLE II-continued

Results of Small Scale Burnthrough Trials

| Sample Structure | Time to Burnthrough or to Reach 205° C. (400° F.) |
|---|---|
| Densified Aramid Mica Paper Face (0.13 mm) + Fiberglass Batt 50 mm) | 543 sec reached 205° C./400° F. |
| Kapton ® Polyimide Film Face (0.025 mm) + Densified Aramid/ Mica Paper (0.08 mm) + Fiberglass Batt (50 mm) | 528 sec reached 205 ° C./400° F. |

[1]Aramid batt was a batt of 100 percent meta-aramid staple fibers.
[2]Fiberglass batt was a batt of glass fibers with a resin binder sold by John Mansville Corp.

Example 2

Referring to FIGS. 1 and 2, sets of two insulation blanket assemblies 21, 122 cm long by 45 cm wide (4' long by 20" wide) with 12.5 cm (5") side tabs were fabricated using a 0.012 mm (0.5 mil) polyester film bag 25 for testing in the FAA Burnthrough Test apparatus 10. Oil burner 14 was operated at an air velocity of 945 m$^3$/min (3100 fpm), a fuel feed rate of 18.9 liters/hour (6 gal/hr), and a temperature of greater than 1094° C. (2000° F.). Make-up of the assemblies was as shown in Table III. The Burnthrough test was conducted and the results demonstrate the effectiveness of the composition of this invention in stopping flame penetration. The results also demonstrate that positioning the aramid/mica paper between the flame and the insulation is most effective in reducing heat penetration by slowing the melting of the glass insulation.

TABLE III

FAA Burnthrough Tests of Flame Barrier Compositions

| Sample Structure | Heat Flux at 240 sec Exposure Kcal/m$^2$sec (BTU/hrft$^2$) |
|---|---|
| Polyester Film Bag[1] (0.0125 mm) + Fiberglass Batt (50 mm) | Burnthrough in 50 sec |
| Polyester Film Bag (0.0125 mm) + Densified Aramid/Mica Paper (0.13 mm) behind Film Facing Fire + Fiberglass Batt (50 mm) | 2.58 (0.6) (No burnthrough in 300 sec) |
| Polyester Film Bag (0.0125 mm) + Densified Aramid/Mica Paper (0.13 mm) in Center Between Fiberglass Batts (25 mm each) | 4.56 (1.06) (No burnthrough in 270 sec) |

[1]The polyester film bag was made from Mylar ® brand polyester film sold by E. I. du Pont de Nemours and Company.

Example 3

As in Example 2, blanket assemblies were fabricated using materials as indicated in Table IV. The test was conducted as in Example 2 with results as shown in Table IV. The test results demonstrate the effectiveness of the composition of this invention in stopping flame penetration and the effectiveness of using densified aramid/mica paper to reduce heat penetration and slowing the melting of the glass insulation.

TABLE IV

FAA Burnthrough Test of Flame Barrier Compositions

| Sample Structure | Heat Flux at 240 sec Exposure Kcal/m$^2$sec (BTU/hrft$^2$) |
|---|---|
| Polyester Film Bag (0.0125 mm) + Fiberglass Batt (50 mm) | Burnthrough in 49 sec |
| Polyester Film Bag (0.0125 mm) + Densified Aramid/Mica Paper (0.13 mm) behind Film Facing Fire + Fiberglass Batt (50 mm) | 4.3 (No burnthrough in 330 sec) |
| Polyester Film Bag (0.0125 mm) + Densified Aramid/Mica Paper (0.08 mm) behind Film Facing Fire + Fiberglass Batt (50 mm each) | Burnthrough in 210 sec |
| Polyester Film Bag (0.0125 mm) + Undensified Aramid/Mica Paper (0.20 mm) behind Film Facing Fire + Fiberglass Batt (50 mm) | Burnthrough in 174 sec |

What is claimed is:

1. A flame barrier paper composition comprising a uniform mixture of 25 to 60 weight percent meta-aramid fibrids, 40 to 70 weight percent mica, and 0 to 20 weight percent meta-aramid floc having a total basis weight of 100 to 500 g/m$^2$ and exhibiting a burnthrough time of at least 240 seconds under conditions of the FAA Burnthrough Test Standard for Aircraft Insulation at a temperature of at least 1150° C.

2. A paper made from the composition of claim 1 wherein the paper has an outer moisture blocking material layer of polyvinyl fluoride, polyimide, or polyester film.

3. The composition of claim 1 wherein the paper composition is contained in a bag of polymeric film.

4. The composition of claim 3 wherein the bag of polymeric film is selected from the group consisting of polyester, polyvinyl fluoride, and polyimide.

5. The composition of claim 3 wherein the bag also contains insulative material.

6. The composition of claim 5 wherein the insulative material is glass wool or aramid batting.

7. A process for slowing the advance of a flame comprising the steps of: a) placing a flame barrier paper composition comprising a uniform mixture of 25 to 60 weight percent meta-aramid fibrids, 40 to 70 weight percent mica, and 0 to 20 weight percent meta-aramid floc having a total basis weight of 100 to 500 g/m$^2$ and exhibiting a burnthrough time of at least 240 seconds in a path of the flame and b) holding the composition in that path to absorb and reflect heat from the flame.

\* \* \* \* \*